W. H. HAMMON.
PIPE COUPLING.
APPLICATION FILED JULY 24, 1908.
931,296.
Patented Aug. 17, 1909.
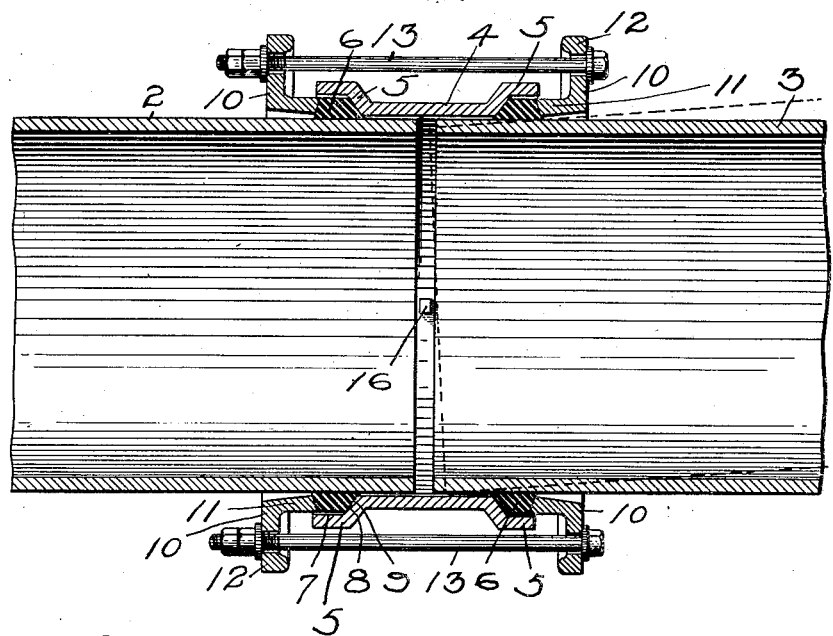
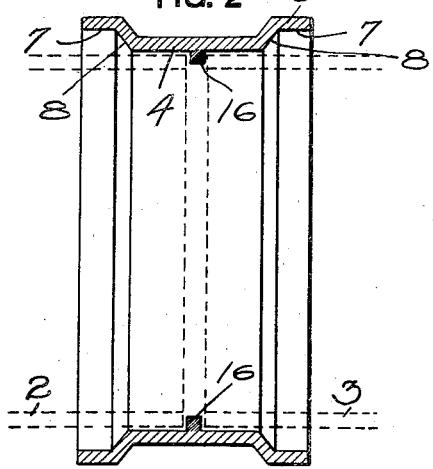
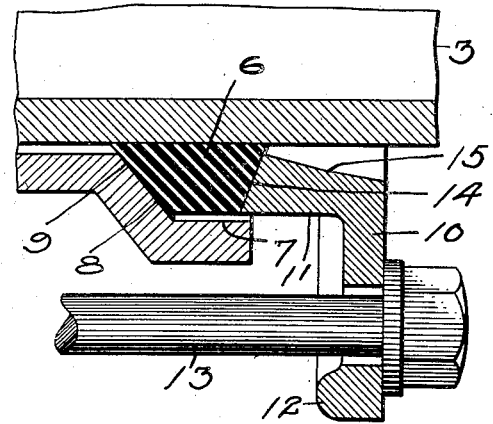
WITNESSES:
INVENTOR:
William H. Hammon
by James K. Bakewell
his attorney

UNITED STATES PATENT OFFICE.

WILLIAM H. HAMMON, OF PITTSBURG, PENNSYLVANIA.

PIPE-COUPLING.

No. 931,296.　　　Specification of Letters Patent.　　　Patented Aug. 17, 1909.

Application filed July 24, 1908. Serial No. 445,067.

*To all whom it may concern:*

Be it known that I, WILLIAM H. HAMMON, of Pittsburg, in the county of Allegheny and State of Pennsylvania, have invented a certain new and useful Improvement in Pipe-Couplers, of which the following is a full, clear, and exact description, reference being had to the accompanying drawing, forming part of this specification.

My invention relates to pipe couplers for connecting the meeting ends of pipes and its object is to provide a simple, durable, and inexpensive coupler, whereby the meeting ends of pipe may be quickly joined together.

A further object of my invention is to provide means whereby the joint may be readily broken or opened without destroying the coupler ring or pipe sections, and it consists in the construction and combination of parts as will be hereinafter more fully set forth, reference being had to the accompanying drawings, in which—

Figure 1 is a longitudinal sectional view illustrating my invention; Fig. 2 is a longitudinal transverse sectional view of the coupler ring; and Fig. 3 is an enlarged fragmentary sectional view to be hereinafter referred to.

I will now describe my invention so that others skilled in the art to which it appertains may understand and construct the same.

In the drawings, the reference numerals 2 and 3 represent the adjacent ends of two pipe sections. These end sections are surrounded by the steel coupler ring 4 which is provided at each end with an annular enlargement 5 adapted to receive the gasket 6. This enlargement 5 is formed with a straight face 7 and an inclined or beveled face 8. The gasket 6 is provided with a correspondingly inclined face 9 which is adapted to bear against the face 8, and is held in place by means of the follower ring 10 which consists of the inwardly projecting annular flange 11 adapted to bear against the gasket 6, and the radial flange 12 through which the connecting bolts 13 are adapted to pass. The inner face of the flange 11 is slightly inclined as indicated by the numeral 14 (see Fig. 3) and bears against the similarly inclined outer face of the gasket 6. The purpose of this inclined face 14 is to prevent undue lateral spreading of the gasket when it is forced home by the follower-ring. Consequently a more effective seating of the gasket is obtained when forced against the face 8 of the coupler ring than would be the case were the gasket allowed to spread laterally and become misshaped. The opening in each follower ring is flared outwardly as at 15 so that the pipe sections may be readily fitted together. The steel coupling ring 4 is provided on its inner face midway between its ends with two diametrically oppositely arranged separately formed frangible lugs 16 which serve as a stop to limit the endwise movement of the pipe sections when being placed within the coupler ring and causes their ends to stop midway between the ends of the coupler ring. These lugs 16 are secured to the coupler ring 4 by welding in any suitable manner, so that when it is desired to break or open the joint, the lugs may be readily broken off by causing the coupler ring to be driven to one side along the pipe. This, however, does not prevent further using of the coupler ring, as it is apparent that the ring may again be slid into position and locked in the usual manner by means of the gaskets and follower-rings.

The advantages of my invention will be appreciated by those skilled in the art. By my invention I am able to form a joint that may be readily broken without destroying either the coupler or the pipe sections.

Having thus described my invention, what I claim and desire to secure by Letters Patent is;

1. In a pipe coupler a steel coupling ring having separately formed frangible stops secured to the interior face of the same.

2. A pipe coupler comprising a ring portion for the reception of the pipe ends, follower rings coacting with said ring portion, and separately formed lugs secured to the inner periphery of said ring portion.

3. A pipe coupler comprising a ring portion for the reception of the pipe ends, follower rings coacting with said ring portion, and separately formed frangible lugs welded to the inner periphery of said ring portion.

In testimony whereof, I have hereunto set my hand.

WILLIAM H. HAMMON.

Witnesses:
　JAMES K. BAKEWELL,
　M. ARTHUR KELLER.